United States Patent [19]

Chang

[11] Patent Number: 5,019,764

[45] Date of Patent: May 28, 1991

[54] PORTABLE LASER SCANNING SYSTEM AND SCANNING METHODS HAVING A RESONANT MOTOR CONTROL CIRCUIT

[75] Inventor: Sheldon Chang, Port Jefferson, N.Y.

[73] Assignee: Symbol Technologies, Inc., Bohemia, N.Y.

[21] Appl. No.: 322,188

[22] Filed: Mar. 13, 1989

[51] Int. Cl.[5] .......................................... H02K 29/08
[52] U.S. Cl. ..................................... 318/627; 318/254; 318/640; 235/472; 235/462
[58] Field of Search ............... 318/603, 627, 662, 626, 318/468, 577, 567, 640, 558, 128; 235/462, 455, 463, 464, 472, 487, 489, 467, 470; 250/566, 234, 568; 358/183, 160, 167, 105, 335, 106, 101, 107, 336, 93

[56] References Cited

U.S. PATENT DOCUMENTS

| | | | |
|---|---|---|---|
| 3,631,274 | 12/1971 | Stauder | 310/66 |
| 3,636,317 | 1/1972 | Torrey . | |
| 3,774,014 | 11/1973 | Berler | 235/61.11 E |
| 3,818,467 | 6/1974 | Willis | 310/75 A |
| 3,848,087 | 11/1974 | Carrell | 318/640 X |
| 4,025,761 | 5/1977 | Hayosh et al. | 235/61.11 E |
| 4,041,322 | 8/1977 | Hayosh et al. | 250/568 |
| 4,387,297 | 6/1983 | Swartz et al. | 235/462 |
| 4,494,024 | 1/1985 | Braun | 310/75 A |
| 4,496,831 | 1/1985 | Swartz et al. | 235/472 |
| 4,575,625 | 3/1986 | Knowles | 235/467 |
| 4,593,186 | 6/1986 | Swartz et al. | 235/472 |
| 4,709,195 | 11/1987 | Hellekson et al. | 318/254 |

Primary Examiner—Paul Ip

[57] ABSTRACT

A lightweight hand-held scanning device for repetitively scanning a laser light source having a laser light generating means and at least one high speed scanning motor controlled by a resonant motor circuit which automatically controls the frequency and amplitude of oscillation of a high speed scanning motor. The frequency and amplitude control is accomplished by using a single feedback signal obtained from the windings of the motor which indicates resonance and which also measures the amplitude of oscillation. The feedback signal obtained is a second harmonic of the driving current. The circuit can be utilized to tune and maintain the motor in a resonant oscillating mode. By controlling both the frequency and amplitude of oscillation the high speed scanning motor can maintain a consistent scanning speed and use less power.

29 Claims, 3 Drawing Sheets

PORTABLE LASER SCANNING SYSTEM AND SCANNING METHODS HAVING A RESONANT MOTOR CONTROL CIRCUIT

REFERENCE TO RELATED APPLICATIONS

This application is related to U.S. patent applications Ser. Nos. 382,722, 428,834, and 465,980 assigned to Symbol Technologies, Inc.

BACKGROUND OF THE INVENTION

1. Field of the Invention

The present invention relates to laser scanning systems for reading bar code symbols, and more particularly, to motor control circuits for hand held portable laser scanning heads.

2. Description of the Prior Art

The increased use of bar code symbols to identify products, particularly in retail business, has resulted in the development of various bar code reading systems. Many applications of bar code scanners require portable hand-held scanners which place a premium on size, weight and power requirements for the devices. One such system is a laser scanning bar code reading system as described in U.S. Pat. No. 4,496,831, assigned to the same assignee as the present invention and incorporated by reference herein.

The laser scanning system disclosed in U.S. Pat. No. 4,496,831 includes a portable hand-held scanning head which may be embodied in various shapes but preferably has a gun-shaped housing made of lightweight but flexible plastic. A handle and barrel portion are provided to house the various components of the scanning head therein. Within the barrel portion are mounted a miniature light source, miniature scanning means for sweeping the light source across a bar code symbol, and miniature sensing means for detecting reflected light from the bar code symbol being scanned. The handle portion generally supports a d.c. power supply.

The miniature light source comprises a laser tube such as a co-axial helium-neon laser tube, or preferably, a semiconductor laser diode, which is considerably smaller and more lightweight than a laser tube, which of course will cut down on the required size and weight of the scanning head, thus making the scanning head easier to handle and more maneuverable. Light generated by the light source passes through the optic train which focuses the beam to impinge upon the scanning means, which are mounted in the light path within the barrel portion of the scanning head. The scanning means sweeps the laser beam across the bar code symbol, and comprises at least one scanning motor for sweeping the beam lengthwise across the symbol, and preferably comprises two motors, where the second motor sweeps the beam widthwise across the symbol. Light reflecting means such as mirrors are mounted on the motor shafts to direct the beam through the outlet port to the symbol. The sensing means then detects and processes the light reflected off the symbol, and generally comprises photosensitive elements such as semiconductor photodiodes.

The structural aspects of the scanning motor are analogous to a simplified stepper motor which is a device used to convert electrical pulses into discrete mechanical angular movements every time the currents in the stator windings are changed. By alternately energizing and de-energizing the two stator coils of a stepper motor, the magnetic interaction between the rotor poles and the stator poles causes the rotor to turn in discrete angular steps over the entire 360 degree circumference of the output shaft. In contradistinction to stepper motors, the scanning motor control means is operative to oscillate the shaft first in one circumferential direction over an arc length less than 360 degrees and secondly in the opposite circumferential direction over an arc length less than 360 degrees, and thereafter to repeat the aforementioned cycle at a high rate of speed.

The motor control means for the portable scanning head includes a reference means for applying a generally constant low level direct current voltage to one of the stator windings, thereby energizing one set of stator poles as north and south. The motor control means also includes a variable means for applying a periodic voltage of time-varying amplitude to the second set of stator windings, thereby energizing the second set of stator poles as north and south. The first set of stator poles, due to the d.c. current, define a neutral rotor position. When the rotor is displaced by a small angle from the neutral position, the stator poles exert a restoring torque on the rotor which is approximately proportional to the product of the d.c. current and the rotor displacement. The restoring torque is very similar to that generated by a spring. The spring-like action of the d.c. current and the rotating mass form an oscillatory system with a natural resonant frequency which increases as the d.c. current increases. The second set of stator poles exert an oscillatory torque on the rotor, which is thus forced to oscillate at the same frequency of the periodic voltage. The periodic voltage is referred to as the driving voltage, the current it generates is known as the driving current, and its frequency is called the driving frequency. The driving frequency will hereinafter be referred to as the fundamental frequency. When the natural resonant frequency is equal to the driving frequency, a condition of resonance exists, and the driving current required to maintain a given amplitude of oscillation is at its minimum value. However, there is no means for automatically adjusting to the resonance condition in the prior art.

In another aspect of the above referenced patent, a closed loop control circuit is disclosed t provide linear tracking of the laser scanning beam. The control circuit comprises a primary coil, two or more secondary coils and a moveable shield. The shield is fixedly mounted on the motor shaft for joint oscillatory movement therewith, and is located between the primary coil and the two secondary coils. Tuning capacitors are used to tune the secondary coils to resonate at the frequency at which the primary coil is excited, the secondary coils are inductively coupled to it to establish an oscillating magnetic field, and an a.c. voltage of the same high oscillating frequency as the primary coil appears across the secondary coils, and is detected by sensing circuitry. The sensing circuitry detects the voltage on its respectively associated secondary coil, and feeds the voltages to a differential amplifier for generating a difference signal which is proportional to the angular displacement of the shaft. This difference signal is, in turn, fed to one input of another differential amplifier whose input is supplied with a control voltage, and the output of the amplifier is then fed to the stator coil. The device of the aforementioned patent, therefore, sets forth an elaborate system to control the amplitude of oscillation of the motor shaft. However, there is no provision for continually monitoring and adjusting both the frequency and amplitude of oscillation of the motor shaft from a single internal feedback signal.

SUMMARY OF THE INVENTION

The present invention improves on the prior art through the provision of a hand-held scanning head for connection to a bar code symbol scanning system having a novel resonant motor circuit for controlling the high speed scanning motor of such a laser scanning system. The resonant motor circuit of the present invention automatically tunes the high speed scanning motor to operate in resonance with the frequency of the driving current supplied to the motor. One such scanning motor of a laser scanning system is shown in the above referenced U.S. Pat. No. 4,496,831, assigned to the same assignee as the present invention, the entire specification of which is incorporated herein by reference. The scanning motor includes a pair of stator coil windings respectively mounted in upper and lower stator housings. A permanent magnet rotor is surrounded by the stator coils and is operatively connected to the output shaft of the motor for joint oscillatory movement therewith.

By employing the circuit of the present invention, the d.c. current supplied to the d.c. stator windings is controlled in order to produce resonance in motor operation. Resonant motor operation is achieved when the frequency of oscillation of the motor shaft is at or near the natural resonant frequency of the motor. An increase in current supplied to the d.c. stator windings causes an increase in the natural resonant frequency, while a decrease in supplied current causes the opposite effect.

The resonant motor circuit of the present invention also controls the amplitude of oscillation of the scanning motor so that a consistent scanning speed can be obtained regardless of individual scanning motor variations. Increased current supplied to the a.c. stator windings of the motor causes an increase in the amplitude of oscillation, while a decrease in supplied current causes the opposite effect.

Both control functions are accomplished by the resonant motor circuit of the present invention by utilizing a single feedback signal from the motor which indicates frequency as well as amplitude of oscillation. The feedback signal is derived from the d.c. stator windings of the scanning motor and is the second harmonic voltage induced across the d.c. stator windings. By properly manipulating and processing the aforementioned signal, frequency control can be achieved by controlling the current to the d.c. stator windings, and amplitude control can be achieved by controlling the current to the a.c. stator windings.

The hand-held scanning head employing the novel resonant motor circuit of the present invention overcomes the limitations of the prior art by providing for the automatic and continuous tuning of a high speed scanning motor to operate in its resonant mode and for the automatic and continuous controlling of the amplitude of oscillation of the motor to facilitate accurate and fast scanning of a bar code symbol. By operating the motor in a resonant mode, the required motor driving power is greatly reduced. In addition, by automatically controlling the amplitude of oscillation, a consistent scanning speed can be obtained thereby increasing the efficiency of the motor.

Electrical elements employed in any electrical circuit require a certain amount of space or area, and the amount of space or area required is determined first by the physical size of the element, and secondly by the amount of heat and other forms of energy dissipated by the particular device. Therefore, at some point in the design of any electrical circuit, space or area becomes a critical design consideration. As stated previously, in the present circuit both control functions are accomplished via a single feedback signal; thus, additional sensing elements which may be expensive, require additional space and consume more power are not necessary. Accordingly, the present invention system having a new and practical means to control the high speed scanning motor of such a portable laser scanning system where small space, low weight and low power consumption ar design criteria. The resonant motor circuit of the invention will also be useful in controlling high speed motors in a variety of other applications, such as for example, auto-focusing systems of high speed cameras and the automatic scan or seek function in audio and video systems.

BRIEF DESCRIPTION OF THE DRAWING

The foregoing features of this invention will become more readily apparent and may be understood by referring to the following detailed description of a preferred embodiment of the resonant motor circuit, taken in conjunction with the accompanying drawings, in which.

DESCRIPTION OF THE PREFERRED EMBODIMENT

Figure 1:
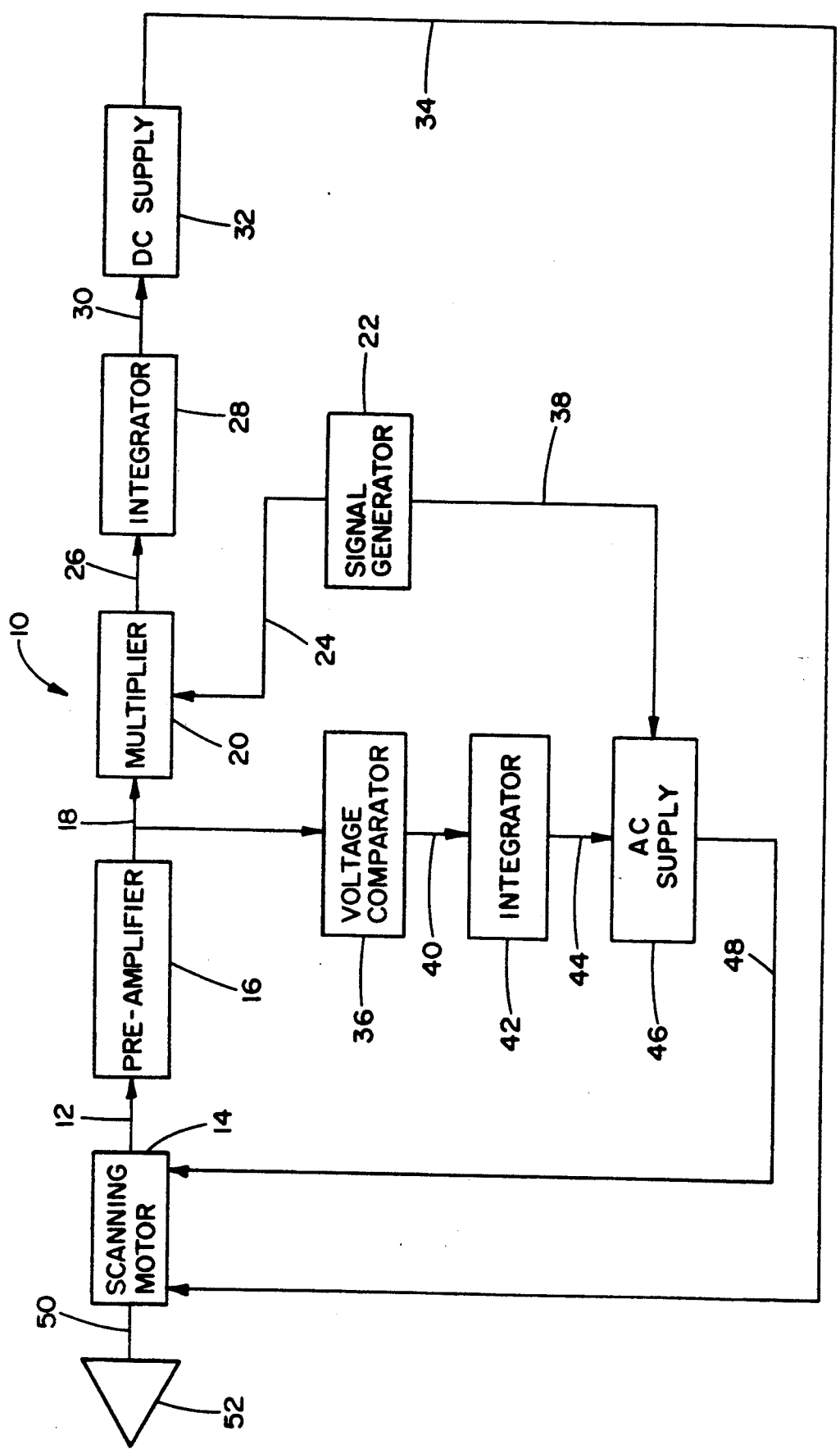
FIG. 1 illustrates a block diagram of the resonant motor circuit of the present invention.

The hand-held bar code scanning head of the present invention for use in laser scanning systems is provided with a novel resonant motor circuit which automatically tunes a high speed scanning motor so that the motor operates in a resonant mode and at the same time automatically controls the amplitude of oscillation of the scanning motor. The resonant tuning and controlling of the amplitude of oscillation of the scanning motor increases the efficiency of the scanning operation and is accomplished by using an induced second harmonic voltage across the terminals of the d.c. stator windings of the motor as a feedback signal in a feedback control circuit. The driving frequency is regarded as the fundamental frequency. A second harmonic of a voltage means a voltage with a frequency twice that of the fundamental frequency. By proper manipulation of the supplied current to the d.c. stator windings of the motor, the motor can be made to operate in its resonant mode. The frequency of a reference signal is set to equal twice the frequency of the driving current, which is the current supplied to the a.c. stator windings of the motor. The motor is in resonance when the driving current frequency is equal to the natural frequency of the motor. When the induced second harmonic voltage and the reference signal are in a correct phase relationship, the frequency of oscillation of the motor shaft will be equal to the natural resonant frequency. The feedback control circuit will detect any difference between the motor natural resonant frequency and the driving current frequency and adjust the d.c. motor current to maintain the resonant condition.

The amplitude control is also derived from the induced second harmonic voltage. By comparison of the amplitude of the second harmonic voltage with another reference signal of predetermined amplitude, the a.c. current supplied to the a.c. stator windings of the scanning motor can be manipulated to bring about the desired control action, which is an increase or decrease in amplitude of oscillation of the motor. The amplitude of the reference signal is determined by the amount of circumferential movement desired in the output shaft of the motor. In the scanning operation, the laser light source generates a laser beam which passes through the lens system or optic train for focusing and is reflected off a mirror mounted on the shaft of the scanning motor. The oscillation of the shaft determines the length of the scanning beam at the output port for scanning the bar code symbol. Preferably, the oscillation is over a 5 degree arc in each direction. If a second motor is provided, the light reflected from the first mirror on the first motor reflects off a second mirror provided on the shaft of the second motor, which oscillates in 5 degree arcs in each direction to determine the width of the scanning beam at the output to scan the symbol. When the amplitude of oscillation is too high, the resonant motor circuit supplies less current to the a.c. stator windings thus causing a decrease in the amplitude of oscillation. When the amplitude of oscillation is too low, the resonant motor circuit supplies more current to the a.c. stator windings thus causing an increase in the amplitude of oscillation.

Referring now to FIG. 1, there is shown a block diagram illustrating the resonant motor circuit 10 employed in a hand-held scanning head for bar code symbol scanning systems. The circuit is comprised of a scanning motor 14 with rotor shaft 50 and mirror 52, pre-amplifier 16, a multiplier 20, two integrators 28 and 42, a direct current power supply 32, an alternating current power supply 46, a voltage comparator 36, and a signal generation means 22.

A second harmonic voltage 12 is obtained from the induced voltage of the d.c. stator windings of the scanning motor 14 and amplified by pre-amplifier 16. The induced voltage is proportional to the product of the magnetic flux created by the magnetic field of the rotor and the angular velocity of the motor shaft, which is a concept that is well known in the art. The signal obtained from the d.c. stator windings is a periodic signal comprised of many harmonic components and also a constant d.c. term. The present invention utilizes the second harmonic voltage which is also the second harmonic of the angular velocity.

Figure 2:
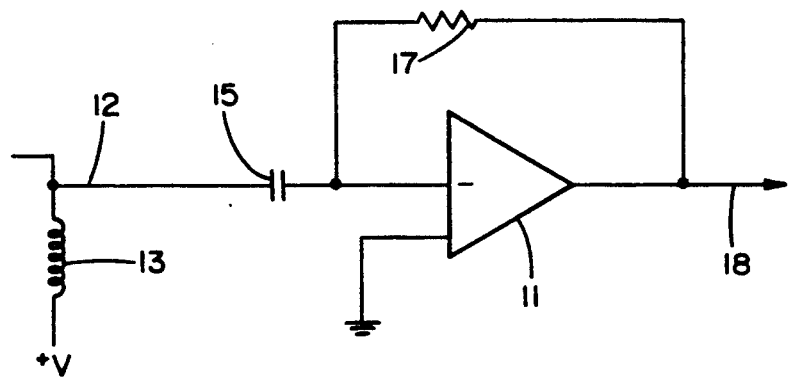
FIG. 2 is a schematic diagram of the pre-amplifier shown in FIG. 1.

The pre-amplifier 16 is an operational amplifier circuit used to filter out the d.c. and nearly d.c. frequencies of the voltage signal from the d.c. windings and amplify only the a.c. harmonics. FIG. 2 shows one example of such a circuit which includes an operational amplifier 11 coupled to the d.c. windings, represented by coil 13, through a series capacitor 15. Resistor 17 is connected in parallel to amplifier 11 and forms a differentiator circuit with capacitor 15. Only the harmonic components in the induced voltage are amplified while d.c. and nearly d.c. frequencies are effectively attenuated.

The amplified second harmonic voltage 18 is then fed into multiplier circuit 20 and to voltage comparator 36 to be described below. A signal generation means 22 which may be clock driven, or multivibrator driven, provides a square wave signal 24 with a predetermined frequency as the second input to the multiplier circuit 20. The signal generator 22 also provides an a.c. control signal 38 to the a.c. supply 46 which in turn provides the a.c. driving current 48 to the motor 14. In the preferred embodiment, the square wave signal 24 has a frequency equal to twice the frequency of the driving current, and is synchronized to the driving current signal. The square wave signal 24 and the driving current signal are synchronized in terms of having a constant phase difference.

The multiplier circuit 20 electronically multiplies the amplified second harmonic voltage 18 and the square wave signal 24. The phase of the second harmonic voltage 18 lags behind the square wave signal 24 by an angular amount, known as the lag angle, depending on the driving frequency. In the preferred embodiment, the lag angle is 90 degrees if the driving frequency is equal to the natural resonant frequency. The lag angle is less than 90 degrees if the driving frequency is lower than the natural resonant frequency, and the lag angle is more than 90 degrees if the driving frequency is higher than the natural resonant frequency. With a lag angle of exactly 90 degrees, multiplication from multiplier circuit 20 produces a zero valued d.c. signal. If there is a frequency difference between the natural resonant frequency and the driving frequency, the lag angle will be more or less than 90 degrees, and correspondingly the multiplication produces a negative or positive d.c. error signal 26.

There are also other harmonic voltages present in the voltage 18 in addition to the second harmonic voltage. However, the second harmonic has by far the largest amplitude. In the multiplication of voltage 18 and square wave signal 24, only harmonics of the same frequencies produce a d.c. voltage. Since the higher order even harmonic voltages (the 4n-harmonics, $n = 1, 2, 3 \ldots$) are absent in the square wave signal 24, these haromonics in voltage 18 have no effect on the error signal 26. The effects of 6th, 10th, etc. harmonics are so small they can be neglected. It should be noted that a multiplier circuit is not the only means to determine or establish the phase difference or frequency error signal between the two signals. However, a multiplier circuit is preferred.

Figure 3:
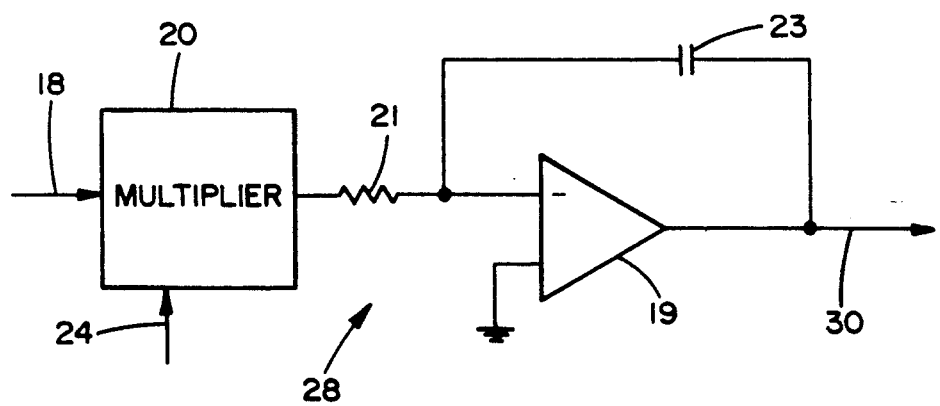
FIG. 3 is a schematic diagram of an integrator of FIG. 1.

The error signal 26 is then passed through an integrator 28, which is used to effectively eliminate any small error that remains. In a proportional feedback control system (control system without an integrator) the corrective action is proportional to the error signal 26. However, in cases where the natural resonant frequency is initially too low, the d.c. current increment, $\Delta I$, required to bring the natural resonant frequency to the same value as the driving frequency can never be achieved. This can never be done because at resonance the error signal 26 would be zero, and no amount of amplification can multiply zero to $\Delta I$. With the integrator 28 as in the present invention, the corrective action is proportional to the output of the integrator 28, which increases as long as there is a remaining error. The output of integrator 28 ceases to increase when the error signal 26 is zero, and it is at this point that the natural resonant frequency equals the driving frequency. FIG. 3 is a schematic diagram of one example of an integrator circuit which includes an op-amp 19 coupled to multiplier 20 through series resistor 21 and parallel capacitor 23. It is important to note that the integrator 28 causes a polarity change in the incoming signal. The polarity change occurs because the operational amplifier of the integrator circuit 28 is configured in an inverting mode as opposed to a non-inverting mode.

If the phase difference between the square wave signal 24 and the amplified second harmonic voltage 18 is greater than 90 degrees, then the output of the multiplier circuit 20 is a negatively valued d.c. voltage signal. This negatively valued d.c. voltage signal is then passed through the integrator 28 and thus the resulting voltage error signal or control signal 30 is now the opposite polarity. This positive valued d.c. voltage control signal 30 causes the d.c. power supply 32 to output more current 34 which is fed into the d.c. stator windings of the high speed scanning motor 14. As the current 34 into the d.c. stator windings in increased, so too is the natural resonant frequency of oscillation. The product of the applied d.c. current and the flux created in the d.c. stator windings is equal to a torque. The torque produced by this relationship is called the restoring torque because it tends to realign the north and south rotor poles with the corresponding stator poles. As the current is increased, so is the torque, which in turn increases the frequency of oscillation in much the same manner that a spring with a higher spring constant will vibrate faster. The current 34 is increased until the point where the two input waveforms into the multiplier 20 are exactly 90 degrees out of phase, whereby the output signal of the multiplier 20 becomes zero valued as mentioned above.

If the square wave signal 24 is less than 90 degrees out of phase with the the amplified second harmonic voltage 18, then the output of the multiplier circuit 20 is a positively valued d.c. voltage signal 26. This positively valued d.c. voltage signal 26 is then passed through the integrator 28 and thus the resulting d.c. voltage control signal 30 is now the opposite polarity. This negative valued dc voltage control signal 30 causes the d.c. power supply 32 to output less current to the d.c. stator windings of the high speed scanning motor 14. As the current into the d.c. stator windings is decreased, so is the frequency of oscillation. The current is decreased until the point where the two input waveforms into the multiplier 20 are exactly 90 degrees out of phase, whereby the output of the multiplier 20 becomes zero valued as mentioned above.

All oscillatory components can be characterized by a resonant frequency. For the scanning motor 14, the resonant frequency is determined, among other things, by the mass of the moving structure and by the fixed magnetic field which is established by the stator windings. Solving the equation of motion for a scanning motor given by:

$$J\ddot{\theta} + f(\dot{\theta}) + KI\sin q\theta = K_1 i\cos(q\theta + \alpha), \quad (1)$$

or in linearized form if both $q\theta$ and $\alpha$ are very small $$J\ddot{\theta} + f\dot{\theta} + kIq\theta = K_1 i, \quad (2)$$

for the resonant frequency results in $$w_r = \sqrt{\frac{KIq}{J}} \quad (3)$$

where,

-continued $w_r$ = natural resonant frequency in radians per second,
$J$ = moment of inertia,
$\ddot{\theta}$ = angular acceleration of the motor shaft,
$f$ = force,
$K$ = motor constant,
$I$ = dc current,
$i$ = ac current,
$q$ = number of pole pairs,
$\dot{\theta}$ = angular velocity of the motor shaft,
$\theta$ = angular position of the motor shaft, and
$\alpha$ = pole location error due to manufacturing tolerances.

As can be seen in the above equation, the resonant frequency, $w_r$, can be altered by changing the amount of current, I, into the d.c. windings. The point at which the resonant frequency of the motor equals the frequency of the driving current is resonance. At resonance, a large amplitude of motion for the motor shaft is obtained for a relatively small input power.

As stated earlier, there is a direct relationship between the current supplied to the d.c. stator windings of the scanning motor and the frequency at which the shaft of the motor oscillates in a natural mode. As current is increased, the natural frequency of oscillation is increased, and the converse holds true. The feedback circuit will automatically adjust the d.c. current, I, to cause the motor shaft to resonate at the driving frequency. In a resonance mode of operation, the torque supplied by the d.c. stator windings exactly equals the torque caused by inertia, effectively cancelling each other out, resulting in the motor consuming much less power during operation.

Figure 4:
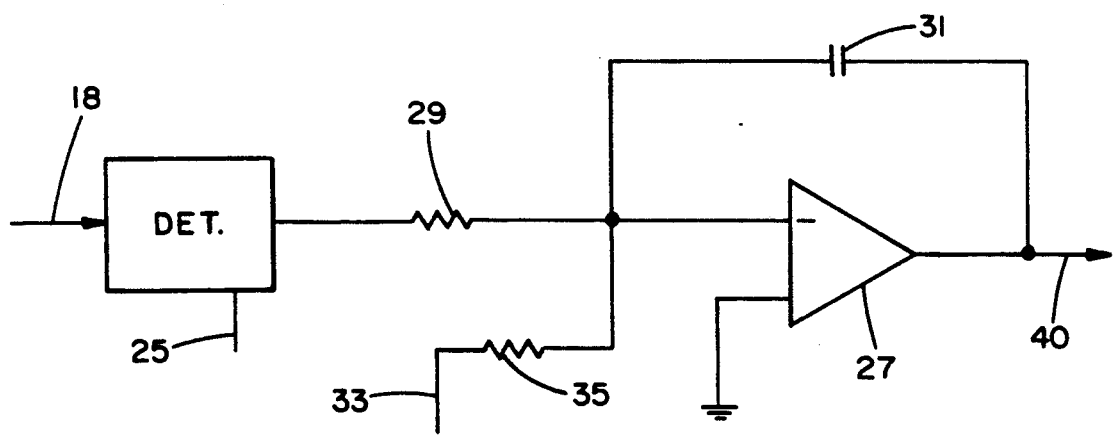
FIG. 4 is a schematic diagram of the comparator shown in FIG. 1.

Referring back to FIG. 1, the amplified second harmonic voltage 18 is also fed into voltage comparator 36. The comparator 36 has a reference signal of a preset amplitude which is compared to the amplitude of the voltage 18 to establish an amplitude relationship. FIG. 4 shows a schematic of one example of comparator 36 having an amplitude detector 25 which is coupled to op-amp 27 through series resistor 29 and parallel capacitor 31. The preset amplitude reference signal 33 is also connected to the negative input of op-amp 27 through resistor 35.

The amplified second harmonic voltage 18 has an amplitude proportional to the square of the amplitude of oscillation. The amplitude of oscillation is the maximum angle of circumferential movement of the motor shaft. The reference signal 33 is chosen in order to achieve a certain amount of angular rotation of the motor shaft. Referring again to FIG. 1, if the amplitude of the amplified second harmonic voltage 18 is higher than the reference signal 33, a positive voltage error signal 40 results which is then fed into an integrator 42 to eliminate any small errors. Once again a polarity change in the voltage error signal 40 occurs by passing the signal through the integrator 42, and therefore, the positive voltage error signal 40 is now a negative voltage error signal 44 which is then fed into the a.c. power supply 46. This negative voltage error signal 44 causes the a.c. power supply 46 to output less a.c. current 48 to the a.c. stator windings of the motor 14. The converse is also true, if the amplitude of signal 18 is lower than the amplitude of signal 33, then the current 48 is increased. This process continues to maintain the amplitude of oscillation at the predetermined level.

The a.c. power supply 46 receives an a.c. control signal 38 from the signal generator means 22. This signal serves as a control signal for the a.c. power supply 46 thereby producing a time varying signal for supplying the a.c. stator windings of the high speed scanning motor.

Figure 5:
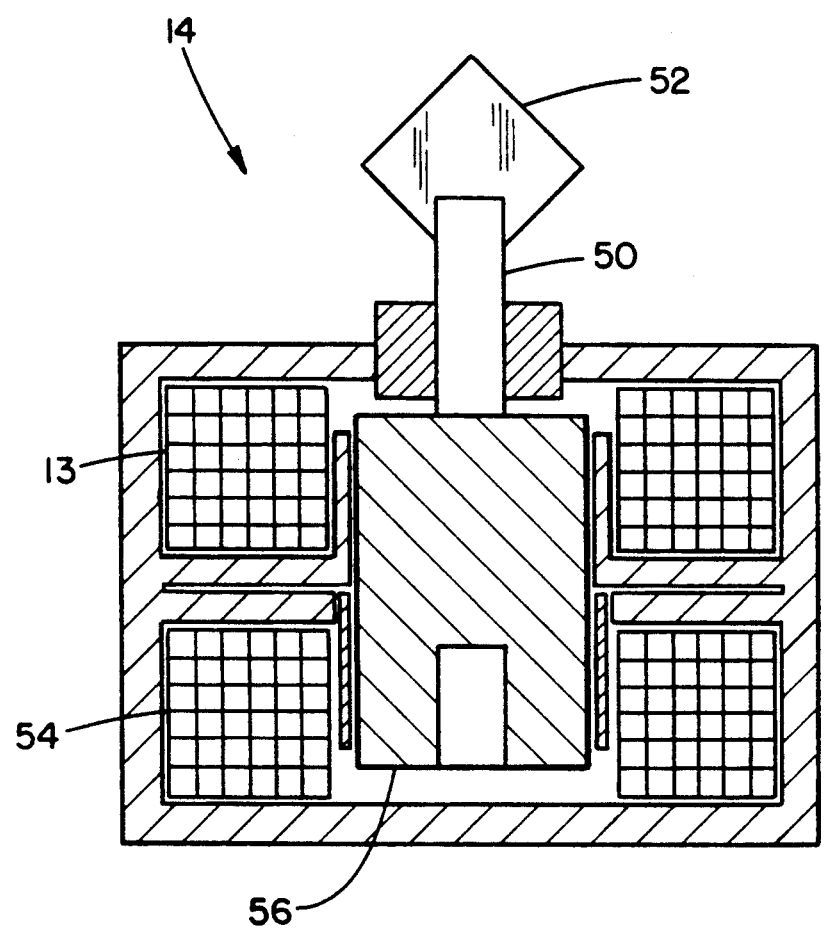
FIG. 5 is a cross-sectional view of the high speed scanning motor of the present invention.

FIG. 5 shows a cross-sectional view of the high speed scanning motor showing the permanent magnet rotor 56, d.c. stator windings 13, a.c. stator windings 54, motor shaft 50 and a light reflecting means 52 attached thereto for joint oscillatory motion therewith.

Therefore, the resonant motor circuit of the invention utilizes an internally induced second harmonic voltage signal to supply frequency and amplitude information for controlling the motor, thereby saving space and power consumption by eliminating the need to provide additional sensing elements.

Although shown and described in what are believed to be the most practical and preferred embodiments, it is apparent that departures from specific methods and designs described and shown will suggest themselves to those skilled in the art and may be used without departing from the spirit and scope of the invention. The present invention is not restricted to the particular constructions described and illustrated, but should be construed to include all modifications that may fall within the scope of the appended claims.

What is claimed is:

1. A miniature, hand-held scanning device for repetitively scanning a target, said device having a laser beam generating means, at least one high speed scanning motor and a resonant motor circuit for controlling said scanning motor, said resonant motor circuit comprising:
   first circuit means for automatically tuning a scanning motor to resonance; and
   second circuit means for automatically controlling the amplitude of oscillation of the scanning motor;
   said tuning means and said controlling means being driven from a single feedback signal obtained directly from the scanning motor, said single feedback signal being a second harmonic of a voltage induced in said resonant motor.

2. The scanning device of claim 1, wherein said resonant motor circuit further including means coupled to the scanning motor for obtaining said second harmonic voltage induced within direct current stator windings of the motor to function as said single feedback signal and for providing said second harmonic voltage to said first and second circuit means.

3. The scanning device of claim 1 wherein said first circuit means is a feedback system comprising:
   a means for obtaining and amplifying an induced second harmonic voltage from direct current stator windings of the scanning motor to function as said single feedback signal;
   a signal multiplier means for electronically multiplying said amplified induced second harmonic means and providing an error signal output waveform;
   an integrator means for integrating and causing a polarity inversion in the error signal output waveform and providing an output control signal; and
   a controlled direct current power supply means for supplying current to the direct current stator windings of the scanning motor in response to said output control signal to tune the scanning motor to resonance.

4. The scanning device of claim 1 wherein said second circuit mean is a feedback system comprising:
   a pre-amplifier means for obtaining and amplifying an induced second harmonic voltage from direct current stator windings of the scanning motor to function as said single feedback signal;
   a voltage comparator means for comparing the amplified induced second harmonic voltage to a predetermined signal generated by a signal generating means and providing an error signal output waveform;
   an integrator means for integrating and causing a polarity inversion in the error signal output waveform and providing an output control signal; and
   a controlled alternating current power supply means for supplying current to alternating current stator windings of the scanning motor in response to said output control signal to control the amplitude of oscillation of the motor.

5. A miniature, hand-held scanning device for repetitively scanning a target with laser light, said device having a laser beam generating means and at least one high speed scanning motor, said motor having a stator, d.c. stator windings energized by a d.c. current, a.c. stator windings energized by an a.c. current, a permanent magnet rotor, a shaft connected to said rotor having light reflecting means attached thereto and being operable to oscillate in alternate circumferential directions, and a resonant motor circuit for automatically controlling the frequency and amplitude of oscillation of said scanning motor, said circuit comprising:
   feedback means coupled to the d.c. stator windings for obtaining a feedback signal, said feedback signal being a second harmonic of a voltage induced in the d.c. stator windings;
   frequency error signal means coupled to said feedback means for combining said feedback signal with a first reference signal having a frequency twice that of the a.c. current to output a frequency error signal representative of a difference between the natural frequency of oscillation of the shaft of the scanning motor and the a.c. current frequency;
   d.c. motor control means coupled to said error signal means and the d.c. stator windings for supplying said d.c. current to said d.c stator windings for adjusting the natural frequency of oscillation of the scanning motor in response to the frequency error signal;
   amplitude error signal means coupled to said feedback means for combining said feedback signal with a second reference signal which is proportional to the square of a predetermined amplitude to output an amplitude error signal representative of a difference between the amplitude of oscillation of the shaft of the scanning motor and the the predetermined amplitude; and
   a.c. motor control means coupled to said amplitude error signal means and the a.c. stator windings for supplying said a.c. current to said a.c. stator windings for adjusting the amplitude of oscillation of the scanning motor in response to the amplitude error signal.

6. The scanning device of claim 5 wherein said feedback means includes a pre-amplifier for amplifying the second harmonic induced voltage.

7. The scanning device of claim 6 wherein said frequency error signal means includes a multiplier for electronically multiplying the second harmonic induced voltage and the first reference signal to provide said output frequency error signal.

8. The scanning device of claim 7 wherein said frequency error signal means further includes an integrator for integrating said output frequency error signal.

9. The scanning device of claim 8 further including a signal generating means coupled to said multiplier for providing said first reference signal.

10. The scanning device of claim 9 wherein said signal generating means provides a reference signal having a frequency equal to twice the frequency of the a.c. current driving the scanning motor.

11. The scanning device of claim 6 wherein said amplitude error signal means includes a comparator for comparing the amplitude of the second harmonic induced voltage with the amplitude of said second reference signal stored in said comparator to provide said output amplitude error signal.

12. The scanning device of claim 11 wherein said amplitude error signal means further includes an integrator for integrating said output amplitude error signal.

13. The scanning device of claim 12 wherein said frequency error signal means includes a multiplier for electronically multiplying the second harmonic induced voltage and the first reference signal to provide said output frequency error signal, and an integrator for integrating said output frequency error signal supplied to said d.c. motor control means.

14. The scanning device of claim 13 further including a signal generating means coupled to said multiplier and to said a.c. motor control means for providing said first reference signal to said multiplier and for providing an a.c. control signal to said a.c. motor control means.

15. The scanning device of claim 14 wherein said signal generating means provides a reference signal having a frequency equal to twice the frequency of the a.c. current driving the scanning motor.

16. A method for repetitively scanning a target with light by automatically controlling the frequency and amplitude of oscillation of a scanning motor having light reflective means mounted on a shaft thereof, comprising:
obtaining a single feedback signal directly from the motor, said single feedback signal being a second harmonic of a voltage induced in said motor;
tuning the frequency of oscillation of the motor to resonance in response to the single feedback signal; and
adjusting the amplitude of oscillation of the motor in response to the single feedback signal.

17. The method of claim 16 wherein the step of obtaining a single feedback signal includes obtaining said second harmonic voltage induced within d.c. stator windings of the motor.

18. The method of claim 17 wherein said tuning step comprises comparing the phase of said feedback signal to that of a first reference signal having a predetermined frequency and phase and changing the current to the d.c. stator windings to reduce a difference in the frequencies of the feedback and first reference signals.

19. The method of claim 18 wherein said adjusting step comprises comparing the amplitude of said feedback signal to a second reference signal having a predetermined amplitude and changing the current to the a.c. stator windings of the motor to reduce a difference in the amplitudes of the feedback and second reference signals.

20. The method of claim 19 wherein the frequency comparing step includes providing the first reference signal with said predetermined frequency being equal to twice the frequency of the a.c. current.

21. A method for repetitively scanning a target with light by automatically controlling the frequency and amplitude of oscillation of a scanning motor, said motor having a stator, d.c. stator windings energized by a d.c. current, a.c. stator windings energized by an a.c. current, a permanent magnet rotor and a shaft connected to the rotor having a light reflective means mounted thereon and being operative to oscillate in alternate circumferential directions, said method comprising:
obtaining a feedback signal from the d.c. stator windings, said feedback signal being an induced second harmonic voltage from the d.c. stator windings of the scanning motor;
combining said feedback signal with a first reference signal having a predetermined frequency and phase to output a frequency error signal representative of a difference between the frequency of oscillation of the shaft of the scanning motor and the natural frequency of oscillation of the motor;
adjusting the natural frequency of oscillation of the scanning motor in response to the frequency error signal;
combining said feedback signal with a second reference signal to output an amplitude error signal representative of a difference between the amplitude of oscillation of the shaft of the scanning motor and a predetermined amplitude; and
adjusting the amplitude of oscillation of the scanning motor in response to the amplitude error signal.

22. The method of claim 21 wherein said feedback signal obtaining step includes amplifying the second harmonic induced voltage.

23. The method of claim 22 wherein said frequency combining step includes multiplying the second harmonic induced voltage and the first reference signal to provide said output frequency error signal.

24. The method of claim 23 wherein said frequency combining step further includes integrating said output frequency error signal.

25. The method of claim 24 further including providing said first reference signal with a frequency equal to twice the resonant frequency of the a.c. current.

26. The method of claim 22 wherein said amplitude combining step includes comparing the amplitude of said feedback signal with the of said second reference signal to provide said output amplitude error signal.

27. The method of claim 26 wherein said amplitude combining step further includes integrating said output amplitude error signal.

28. The method of claim 27 wherein said frequency combining step includes electronically multiplying the second harmonic induced voltage and the first reference signal to provide said output frequency error signal, and integrating said output frequency error signal.

29. The method of claim 28 further including providing said first reference signal with a frequency equal to twice the frequency of the a.c. current driving the motor.

* * * * *